W. H. Akins.
Converting Motion.
N° 43,558. Patented July 19, 1864.
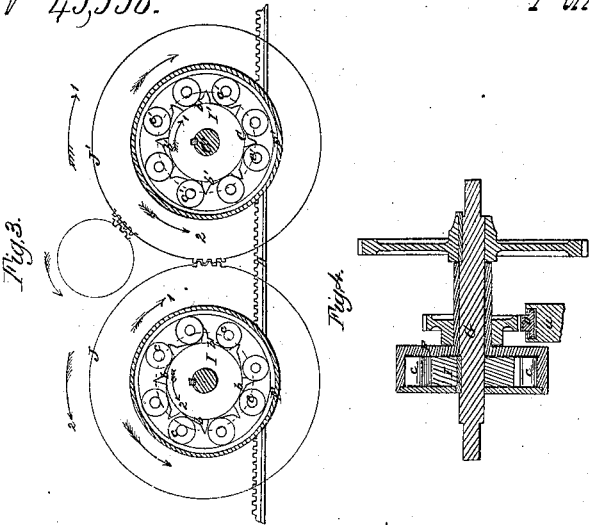
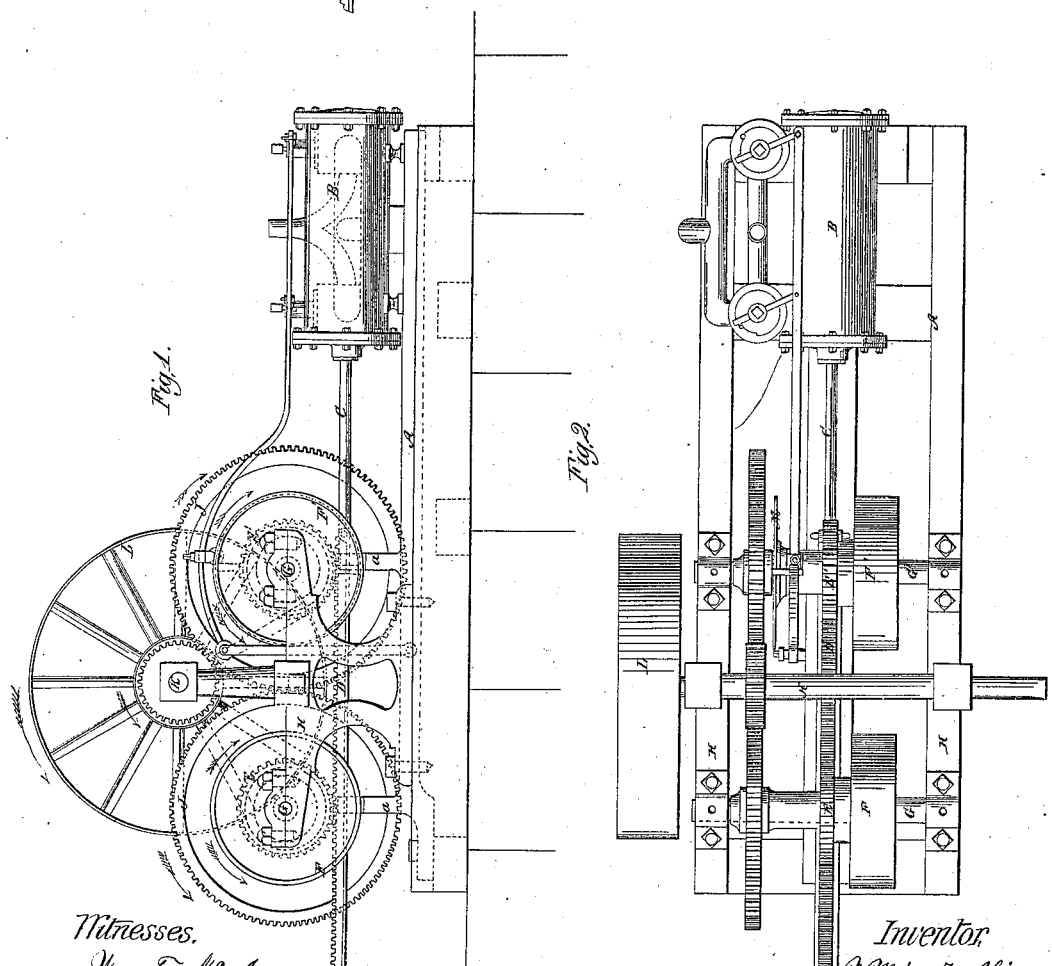
Witnesses.
Wm. F. McNamara.
J. P. Hall.
Inventor.
William H. Akins.

UNITED STATES PATENT OFFICE.

WILLIAM H. AKINS, OF DRYDEN, NEW YORK.

IMPROVEMENT IN CONVERTING MOTION.

Specification forming part of Letters Patent No. 43,558, dated July 19, 1864.

*To all whom it may concern:*

Be it known that I, WILLIAM H. AKINS, of Dryden, in the county of Tompkins and State of New York, have invented a new and useful Improvement in Converting Reciprocating Into Rotary Motion; and I do hereby declare that the following is a full, clear, and exact description thereof, which will enable others skilled in the art to make and use the same, reference being had to the accompanying drawings, forming a part of this specification, in which—

Figure 1 represents a side elevation of my invention. Fig. 2 is a plan or top view of the same. Fig. 3 is a detached front elevation of the principal working parts of my mechanism. Fig. 4 is a longitudinal central section of the same.

Similar letters of reference indicate like parts.

This invention consists in the employment or use of two or more wheels firmly keyed to two or more shafts, and provided on their peripheries with inclined planes rising in opposite directions, in combination with a toothed rack and cog-wheels, and with hollow drums surrounding the wheels with the inclined planes and running loosely on the shafts, and with rollers placed on the inclined planes between the inner circumference of the hollow drums and the outer circumference of the wheels, with the inclined planes in such a manner that in moving the toothed rack in one direction, the rollers in one of the drums run up the inclined planes and bind between the same and the inner peripheries of said drum, rendering the same rigid with the shaft, while at the same time the rollers in the opposite drum are drawn off from the inner circumference of the same, allowing it to rotate independent of its shaft, and if the two shafts are geared together the reciprocating motion of the toothed rack is converted into a positive continuous rotary motion of said shafts, and the dead-centers are completely avoided.

A represents a frame made of iron or any other suitable material, and intended to support a steam-cylinder, B. The piston-rod C of this cylinder connects directly with the toothed rack D, which is guided in suitable ways in standards a, rising from the frame A. By the action of the steam a reciprocating motion is imparted to the piston and to the toothed rack, and this reciprocating motion I intend to convert into a continuous rotary motion.

It must be remarked that instead of to a steam-piston the toothed rack may be connected with any other source of power whereby a reciprocating motion is imparted to the same. The toothed rack D gears in two cog-wheels, E E', which are firmly secured to the hubs of hollow drums F F' and rotate with said drums loosely on the shafts G G'. These shafts have their bearings in suitable journal-boxes on standards H, rising from the frame A, and each of the same carries a wheel, I or I', which is firmly keyed to it inside the drums F F', as clearly shown in Figs. 3 and 4. The diameter of these wheels is considerably smaller than the inside diameter of the drums, and they are furnished on their peripheries with inclined planes $b$ $b'$, rising in opposite directions, as clearly shown in Fig. 3. The spaces between the inclined planes $b$ $b'$ and the inner peripheries of the drums are occupied by rollers $c$ $c'$, the diameters of which are so proportioned that the same, when placed on the lowest parts of the inclined planes, will not come in contact with the inner peripheries of the drums; but if they roll up the inclined planes they will wedge in between them and the inner surfaces of the drums. If the rack moves in the direction of the arrow marked thereon in Fig. 3 of the drawings, the drums F F' will both rotate in the direction of the arrow 1, marked on the wheel I' in Fig. 3. By this motion the rollers $c'$ will be caused to roll up the inclined planes $b'$, and to be wedged between them and the inner periphery of the drum F', and the shaft G' is rendered rigid with said drum and with the cog-wheel E', and caused to rotate with the same. At the same time the rollers in the wheel I are pushed down the inclined planes, and the drum F rotates independent of the shaft G. If the rack moves back in the direction opposite the arrow marked thereon in Fig. 3, the drums rotate in the direction of arrows 2, and the rollers in the wheel I are wedged between the inclined planes $b$ and the drum F, rendering the same rigid with its shaft, while at the same time the drum F' rotates independent of the shaft G'.

From this description it will be understood that by the action of the reciprocating rack a positive rotary motion is imparted to the shaft G in the direction of arrow 2, and to the shaft G' in the direction of arrow 1, and if these two shafts are geared together by cog-wheels J J' the rotary motion of both shafts will be continuous, for as soon as the action on one shaft stops it (the rack) begins to act on the other shaft, and a continuous rotary motion is imparted to the cog-wheel J in the direction of arrow 2, and to cog-wheel J' in the direction of arrow 1. If desired, the motion can be transmitted to a shaft, K, carrying a band-wheel, L, from which the power is transmitted to the working machines; or either of the two shafts G or G' may be provided with a band-wheel to transmit the motion to the working machines. By the use of the rollers c c', placed loosely on the inclined planes b b', all friction is avoided, and the rollers take hold of the drums instantaneously as soon as the motion of the rack in the proper direction begins. If the motive power is derived from a steam-engine, a disk, M, mounted on the shaft G', may be employed to change the valves.

Instead of the toothed rack D and cog-wheels E E', an endless band running on the drums F F' and connected to the piston-rod or reciprocating bar D, or any other equivalent device, may be used.

Having thus described my invention, I claim as new and desire to secure by Letters Patent—

The wheels I I', provided with inclined planes b b' and rollers c c', and firmly keyed to the shafts G G', in combination with the cog-wheels J J' and drums F F', running loosely on the shafts G G', and with the reciprocating bar D, constructed and operating in the manner and for the purpose substantially as herein shown and described.

W. H. AKINS.

Witnesses:
WM. F. McNAMARA,
J. P. HALL.